United States Patent [19]
Perelman

[11] Patent Number: 5,274,696
[45] Date of Patent: Dec. 28, 1993

[54] PROTOCOL FOR TRANSMITTING MESSAGES IN A NETWORK

[75] Inventor: Roberto Perelman, Sunnyvale, Calif.
[73] Assignee: ROLM Company, Santa Clara, Calif.
[21] Appl. No.: 680,952
[22] Filed: Apr. 5, 1991
[51] Int. Cl.⁵ .................... H04M 3/50; H04M 7/00
[52] U.S. Cl. .................... 379/89; 379/207; 379/235
[58] Field of Search .............. 379/89, 207, 88, 201, 379/67, 84, 235, 229

[56] References Cited

U.S. PATENT DOCUMENTS

| | | | |
|---|---|---|---|
| 4,790,003 | 12/1988 | Kepley et al. | 379/88 |
| 4,933,967 | 6/1990 | Lo | 379/207 |
| 5,029,200 | 7/1991 | Haas et al. | 379/89 |
| 5,113,430 | 5/1992 | Richardson, Jr. et al. | 379/88 |

*Primary Examiner*—Thomas W. Brown
*Attorney, Agent, or Firm*—Michael B. Einschlag

[57] ABSTRACT

A method for transmitting voice signals, including user names—alphabetic and/or spoken, and data messages, including network addresses, among sites of a network of store-and-forward messaging system sites using telephone lines. A preferred embodiment of the method for transmitting data messages and voice signals between sending and receiving store-and-forward messaging sites of the network of messaging systems connected by one or more telephone lines includes the steps of: (a) placing a telephone call form the sending site to the receiving site to a predetermined telephone number over one of the telephone lines; (b) connecting data transmission and reception apparatus to the telephone line at the sending and receiving sites; (c) exchanging predetermined control commands and data messages using the data apparatus at the two sites, the commands specifying a communications procedure; (d) disabling the data apparatus from exchanging control commands and data messages and connecting voice transmission and reception apparatus to the telephone line at the two sites; (e) transmitting voice signals between the two sites using the voice apparatus; (f) enabling the data apparatus for exchanging control commands and data messages at the two sites; (g) exchanging delivery information using the data apparatus at the two sites, which information indicates the success or failure of the voice signals transmission, and further communication procedure; and (h) one of the sites going on-hook.

6 Claims, 2 Drawing Sheets

PROTOCOL FOR TRANSMITTING MESSAGES IN A NETWORK

TECHNICAL FIELD OF THE INVENTION

The present invention pertains to a method for delivering messages among sites of a network of store-and-forward messaging system sites using telephone lines.

BACKGROUND OF THE INVENTION

In a network of voice store-and-forward messaging systems, messages are generated at one of the messaging systems and need to be transmitted to another one of the voice messaging sites. Further, it is expensive to connect all of the store-and-forward messaging sites in such a network using data lines and it also entails the added expense of maintaining a separate data communication network. Still further, telephone lines are typically situated for placing calls between sites at which are located messaging systems. As a result, there appear to be advantages in providing methods for transmitting information between messaging systems using telephone lines.

There is a need in the art for a method for transmitting voice messages, user names—alphabetic and/or spoken, and network addresses among sites of a network of store-and-forward messaging sites using telephone lines.

SUMMARY OF THE INVENTION

Embodiments of the present invention advantageously satisfy the above-identified need in the art and provide a method for transmitting voice messages, user names —alphabetic and/or spoken, and network addresses among sites of a network of store-and-forward messaging system sites using telephone lines. In particular, the inventive method for transmitting data messages and voice signals between a sending store-and-forward messaging systems site and a receiving store-and-forward messaging site of a network of store-and-forward messaging systems which are connected by one or more telephone lines comprises the steps of: (a) placing a telephone call form the sending site to the receiving site to a predetermined telephone number over one of the telephone lines; (b) connecting data transmission and reception apparatus to the telephone lines at the sending site and the receiving site; (c) exchanging predetermined control commands and data messages using the data transmission and reception apparatus at the sending and receiving sites, the predetermined control commands specifying the communications procedure; (d) disabling the data transmission and reception apparatus from exchanging control commands and data messages and connecting voice transmission and reception apparatus to the telephone line at the sending site and the receiving site; (e) transmitting voice signals between the sending and receiving sites using the voice transmission and reception apparatus at the sending and receiving sites; (f) enabling the data transmission and reception apparatus for exchanging control commands and data messages at the sending site and the receiving site; (g) exchanging delivery information using the data transmission and reception apparatus at the sending and receiving sites, which delivery information indicates the success or failure of the voice signal transmission and further communication procedure; and one of the sites going on hook.

BRIEF DESCRIPTION OF THE DRAWING

A complete understanding of the present invention may be gained by considering the following detailed description in conjunction with the accompanying drawing, in which.

DETAILED DESCRIPTION

Figure 1:
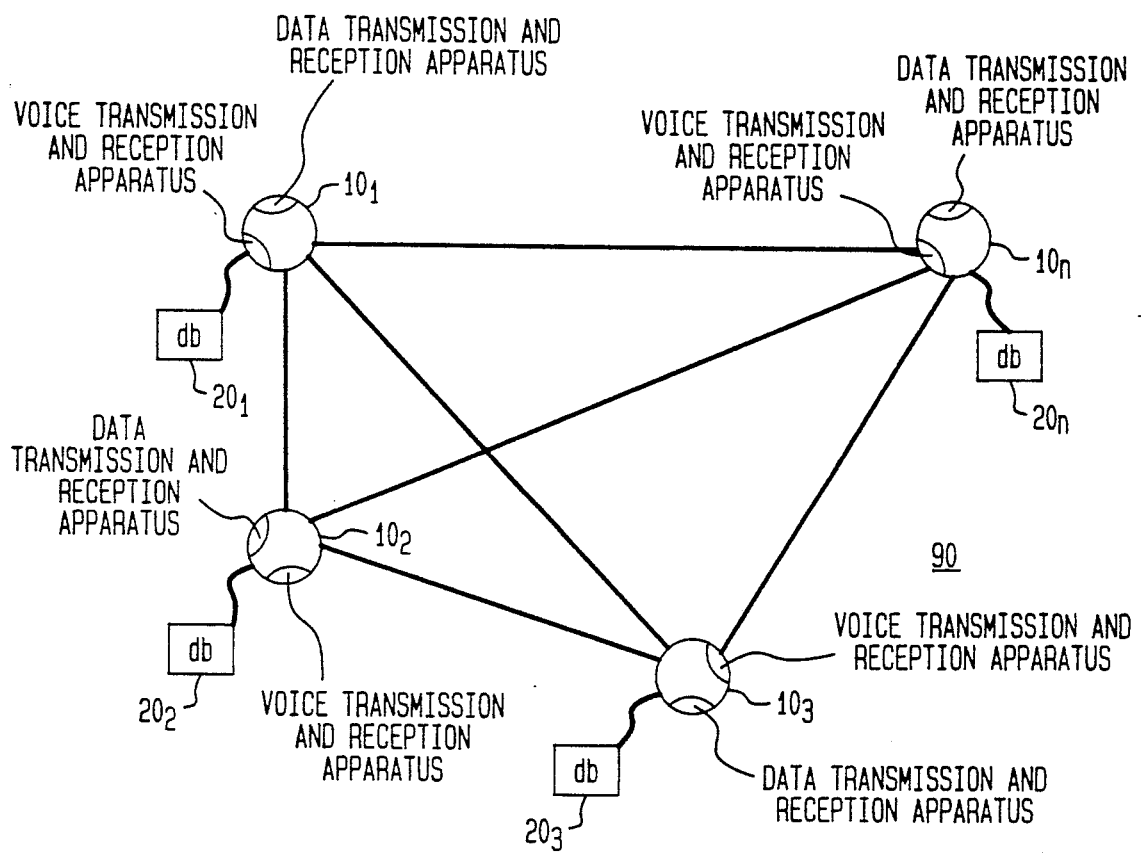
FIG. 1 is an block diagram of a network of store-and-forward messaging system sites.

FIG. 1 shows network 90 which utilizes an embodiment of the present invention. For ease of understanding, we will first describe some basic transactions which are carried out in network 90 before we describe a preferred embodiment of the present invention in detail with reference to FIG. 2.

Network 90 is comprised of voice store-and-forward messaging system sites $10_l$ to $10_n$. Each of store-and-forward messaging system sites $10_l$ to $10_n$ interacts with local users and is comprised of a local database $20_l$ to $20_n$, respectively. Further, as is shown in FIG. 1, each of store-and-forward system sites $10_l$ to $10_n$ has a communications connection with predetermined ones of the other store-and-forward messaging system sites in network 90. Of course, those of ordinary skill in the art clearly appreciate that network 90 may also be embodied in a manner wherein private branch exchanges are utilized so that any site may contact any other site via, for example, the public telephone network. Embodiments of the present invention provide the mechanism whereby the transactions described below occur.

In one type of message transfer transaction which is carried out over network 90, whenever a message sender at a first store-and-forward messaging system site addresses a message recipient at a second store-and-forward messaging system site by name and the message recipient's name is not stored in the message sender's local database, the message sender's local store-and-forward messaging system site requires the message sender to address the message recipient by numeric address. Then, the message sender's local store-and-forward messaging system site transmits the message, for example, a voice message, to the local store-and-forward message system site of the message recipient along with the message sender's alphabetic name and a flag which indicates that the message recipient's name is unknown to the sending system site. In response, the receiving system site sends a communication to the sending system site to: (a) request a spoken record of the message sender's name if the message recipient's system site does not have the message sender's name in its local database and (b) transmit the message recipient's alphabetic and spoken name. Finally, both the sender's and recipient's system sites, as necessary, update their local databases with the sender's and the recipient's alphabetic and spoken names, respectively. As a result of this, as one can readily appreciate, both the sender's and recipient's system sites now know the sender's and recipient's names and name entry and name confirmation can be used the next time a message is addressed to the same recipient and name entry and name confirmation for the message sender can also be used by users of the original message recipient's system site.

In another type of transaction where the message sender's system site has the alphabetic name of the message recipient in its local database, the message sender may address a message recipient by either name or telephone number. Then, when the message sended's local store-and-forward message system transmits a message to the local store-and-forward message system site of the message recipient, both the message recipient's alphabetic name and telephone number are transmitted to the message recipient's system site. In response, the message recipient's system site verifies the message recipient's alphabetic name and telephone number and the message may not be accepted unless both match. This provides a measure of security in case the recipient is a person with the same name as a user who has previously left the system.

Figure 2:
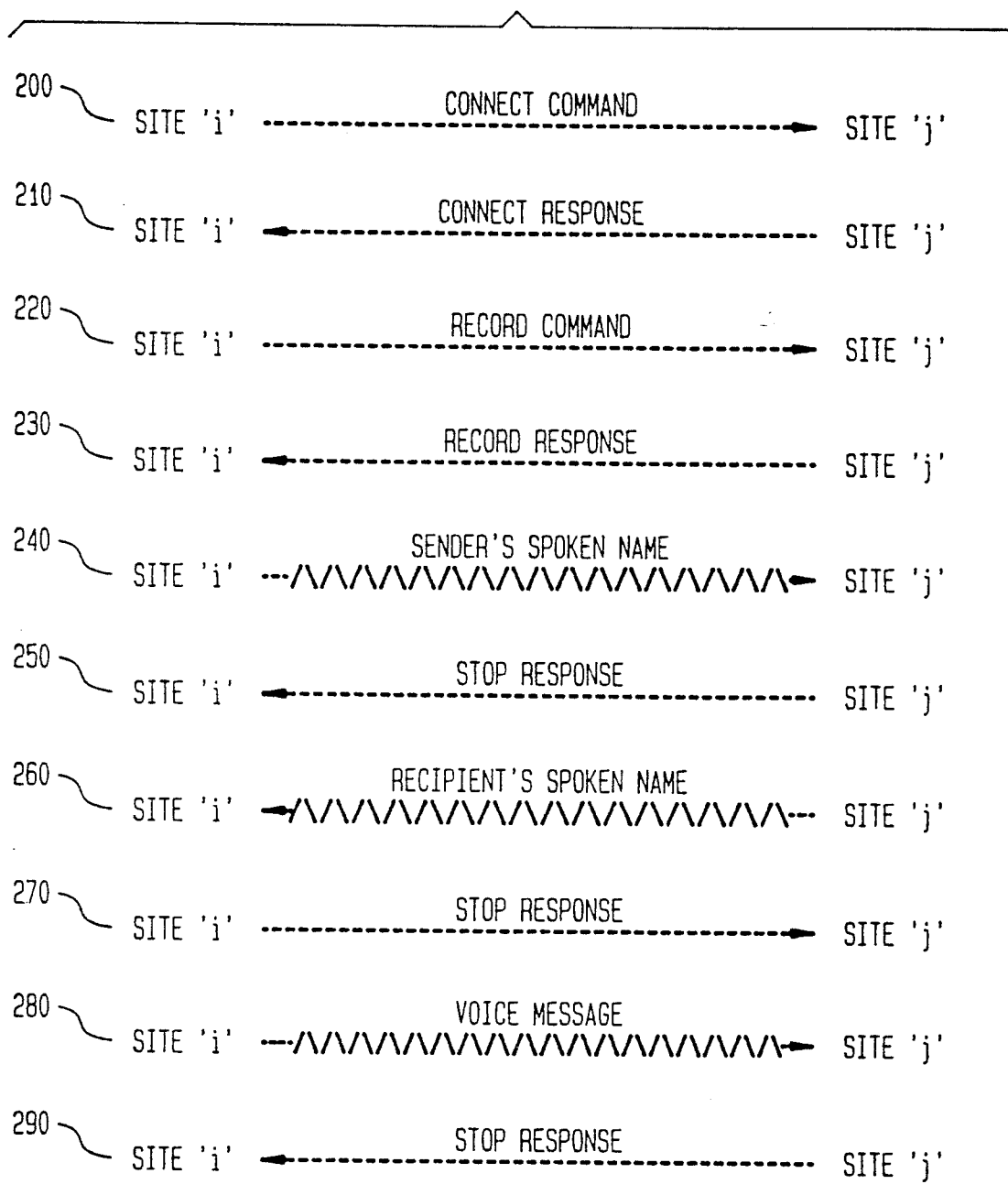
FIG. 2 shows control commands and responses exchanged in accordance with the present invention by two communicating voice store-and-forward messaging sites of the network shown in FIG. 1.

We now turn to describe the manner in which an embodiment of the present invention operates in detail with reference to FIG. 2 to enable the above-described transactions to occur. FIG. 2 shows the control commands and responses exchanged by two communicating voice store-and-forward messaging system sites during a typical session. A session is established when site "i" makes a telephone call to a reserved access number at site"j". The answering site, site "j", knows that this telephone call is a network call which is being made by another voice store-and-forward messaging site, site "i", as opposed to, for example, a telephone call which is being made by a user, because the call is being made to a reserved access telephone number. The telephone call may go over public switched telephone lines or over private lines.

We will now describe the communication between site "i" and site "j" in general terms. First, the communicating sites perform a line test to ensure that the quality of the line is adequate for the session. If the line passes the test, then the two sites connect modems to the line. Although a line test is not essential, it is highly recommended, to ensure that voice signals which are delivered across the network remain of high quality. Those of ordinary skill in the art understand that there are many methods which are well known to those of ordinary skill in the art for performing a line test. Second, using the modems, the sites exchange control commands and responses in a manner which will be described in detail below in connection with FIG. 2. Third, at predetermined times during a session, the sites "turn-off" the modems and the communicating sites exchange voice signals over the line. The voice signals may relate to a voice message being delivered from one user to another or they may relate to a spoken name. After the voice signals are transmitted, the sites "turn-on" the modems to permit the sites to exchange verification of delivery notifications and to move on to the next user message or name. Fourth, a session ends when either site, generally the sending site hangs up by, for example, going on-hook. The other site will disconnect because it will detect the remote modem dropping—for example, it detects a carrier fault—or because the telephone network signals the far end disconnect, whichever occurs first.

The protocol used for communication between sites is comprised of four (4) layers. The first or bottom layer, i.e., the physical layer is where mechanical, electrical, functional, and procedural characteristics are defined to access a physical medium, for example, a telephone line. The next or second layer, i.e., the data link layer, provides for reliable transfer of information across the physical layer by sending blocks of data, referred to as frames, along with synchronization, error control, and flow control. In addition, the second layer also supervises transitions from: (a) line test stage to modem; (b) from modem to voice; and (c) voice to modem. The first two layers are well known to those of ordinary skill in the art.

We next describe the third layer, i.e., the session layer, and the fourth layer, i.e., the application layer. FIG. 2 shows the control commands and responses which reside at the session and application layers.

The session layer provides a structure for communication between applications and, as such, it establishes, manages, and terminates connections, i.e., sessions, between message delivery applications. The application layer carries out exchanges of user messages and names using services provided by the bottom layers.

In particular, as shown in FIG. 2 at line 200, to initiate a session layer, sending site "i" generates a "Connect command" whenever the bottom layers notify it that the link is ready, i.e., receiving site "j" has answered, the line test has been performed and passed, and the modem is on line. A "Connect command" comprises the following information: (a) protocol version number used by sending site "i" so that sites which utilize older versions of the protocol can communicate—for example, if the protocol version numbers of sending site "i" and receiving site "j" are different, the older protocol is used; (b) channel number, i.e., port, being used by sending site "i" for this session—this is needed to route received application layer commands and responses to the proper process, i.e., the software task that is handling this particular session; (c) flag to indicate whether sending site "i" will permit receiving site "j" to turn the connection around after sending site "i" has finished sending all its voice messages, so that receiving site "j" can "piggyback," i.e., send, its own messages during the same call —the "piggyback" feature is decided solely by sending site "i"; (d) flag which indicates whether sending site "i" will exchange names with receiving site "j"—if one site is willing to exchange, but not the other, the latter wins; (e) identification of sending site "i"; and (f) identification of sending node. The byte format for this command is set forth in detail in the Appendix.

As shown in FIG. 2 at line 210, in response to the "Connect command," receiving site "j" sends a "Connect response" back to site "i". A "Connect response" comprises the following information: (a) protocol version number used by receiving site "j"; (b) channel number being used by receiving site "j" for this session; (c) flag which indicates whether receiving site "j" will exchange names with sending site "i"; (d) status code which indicates whether receiving site "j" will accept the call or a reason why it cannot; (e) identification of receiving site "j"; and (f) identification of receiving node. The byte format for this command is set forth in detail in the Appendix.

If a session is established successfully in accordance with the above-described "Connect command" and "Connect response" dialogue, then the connection settles into "steady-state" mode. In this stage, the next set of commands and responses shown in FIG. 2 will repeat once for every subscriber message that needs to be delivered.

As shown in FIG. 2 at line 220, the first command of a repeating set is a "Record command" which is sent from sending site "i" to receiving site "j". The "Record command" comprises the following information: (a)

message sender's network address and message recipient's network address; (b) message recipient's name if it is available at sending site "i"—This is sent so that receiving site "j" can verify that both the message recipient's network address and name match a profile of a message recipient. If the message recipient's name or the message recipient's network address or both do not match a profile stored in a local database associated with receiving site "j", receiving site "j" will notify sending site "i" accordingly; (c) message sender's name if the communicating sites negotiated during session establishment that user names would be exchanged; (d) flag to indicate whether spoken names for the message sender and the message recipient are available at sending site "i"—this is only needed if the communicating sites negotiated during session establishment that names would be exchanged; (e) date and time when the message sender recorded the message; (f) size of the recorded message, in seconds; (g) flag to indicate whether this is a regular message which is received by a message receiver in due course, a message which is being forwarded from a first message recipient to another message recipient, a return receipt notification of the receipt of a message, a message that is being returned to the sending site as undeliverable, or a specially marked "name only" message which will be described further below; (h) flag to indicate special delivery options requested by the message sender such as, for example: (1) whether this message is to be delivered immediately or is to be batched for delivery at system administrator configurable times of the day, (2) whether this is a private message which may not be forwarded by the message recipient to others, and (3) whether the message sender requested a return receipt to be sent when the message recipient listens to the message; (i) identification code which is unique for each message—this is used to detect duplicate delivery of the same message and is needed, for example, in instances where a receiving site delivers a message to a message recipient, but the connection is abnormally dropped before the sending site has been notified of the successful delivery; and (j) identification code which is unique to each recorded voice file stored at the sending site,—this is used in instances where the same recording is used by more than one message such as, for example, when a message sender addresses the same message to multiple message recipients so that the voice portion need only be transmitted once. The byte format for this command is set forth in detail in the Appendix.

As shown in FIG. 2 at line 230, in response to the "Record command," receiving site "j" sends back a "Record response" which comprises the following information: (a) status code, indicating whether receiving site "j" will accept the message or the reason why it cannot. Some possible reasons for not accepting the message are: (i) the message recipient is not valid one, (ii) the message recipient's mailbox is full, and (iii) so forth; (b) a flag indicating whether the message sender's name was added to the database at receiving site "j"; (c) a flag indicating whether receiving site "j" wishes to receive the spoken name of the message sender and whether it intends to send the spoken name of the message recipient; (d) name of the message recipient, if sending site "i" did not include it in the "Record command" because sending site "i" did not have it and the communicating sites negotiated during session establishment that user names would be exchanged. The byte format for this command is set forth in detail in the Appendix.

The next step in the communication depends on the particular "Record command" and "Record response" exchanged in a particular case. For example, line 240 of FIG. 2 shows a portion of a communication wherein the next step comprises sending site "i" transmitting the message sender's spoken name to receiving site "j". This transmittal is accomplished when site "i" and site "j" switch off their modems and, then, sending site "i" transmits the message sender's spoken name while receiving site "j" receives and records it. Once the recording is completed, site "i" and site "j" switch their modems back on so that receiving site "j" may acknowledge successful or non-successful reception. As shown at line 250 of FIG. 2, this is done when receiving site "j" transmits a "Stop response" to sending site "i", which "Stop response" comprises a status code. The byte format for this command is set forth in detail in the Appendix. The reason this is considered a response is because the command to stop recording is implicitly generated by sending site "i" when it stops playback and switches its modem on, thereby causing receiving site "j" to turn its modem on too. If it is appropriate for the communicating sites to skip transmission of the spoken name for the message sender, they just simply eliminate the two steps above in the sequence.

Site "i" and site "j" may decide, based on the "Record command" and "Record response" sent previously, to transmit the spoken name for the message recipient. To do that, they just repeat the two steps outlined above, reversing roles, as shown by lines 260 and 270 of FIG. 2. If this is not appropriate, these steps are skipped.

Finally, as shown by lines 280 and 290 of FIG. 2, a voice message is transmitted in a manner which is similar to the manner in which the spoken names were transmitted. Note that these steps may also be skipped. This would occur, for example, in cases such as: (a) delivery of a "return receipt"—which "return receipt" has no associated voice message; (b) delivery of a message for which receiving site "j" already has the recording; or (c) duplicate delivery of a previously sent message.

In accordance with the present invention, a variation of the above-described repeating set of commands and responses is used whenever sending site "i" wishes to "export" a selected list of subscriber names, alphabetic and spoken, to receiving site "j". In this event, since the subscriber names being sent are not associated with a voice message being delivered, the "Record command" specifies that this is a "name only" message. Then, only a "Record command", "Record response", optionally the message sender's spoken name, and "Stop response" are exchanged.

After sending site "i" has finished delivering everything it intended to deliver, control of the connection reverts back to the session layer. At this point, sending site "i" has two options. First, it goes on-hook, i.e., "hangs up", to signal the end of the call or, second, it sends a "Piggyback command" having no parameters. The byte format for this command is set forth in detail in the Appendix. If sending site "i" sends a "Piggyback command", then receiving site "j" determines whether it has any messages to deliver to sending site "i". If it does, receiving site "j" responds by transmitting a "Connect command" to initiate a session from the beginning, except with roles reversed and in the opposite direction. Otherwise, receiving site "j" responds to the "Piggyback command" by going on-hook.

In a preferred embodiment of the present invention, a digital signal processor (DSP) is used to provide the above-described functions which relate to a modem. This is advantageous in a messaging system such as the ROLM Systems PhoneMail messaging system because any channel, i.e., port, may be used for network message delivery and dedicated ports are not needed. In fact, the same board used in PhoneMail for voice processing using DSP techniques provides modem emulation and line test functions used at the beginning of a network message delivery session, i.e., the same hardware is used to run the DSP code needed for voice processing, modem emulation, and line testing. This permits one to utilize any port for intersite message delivery. For example, in a preferred embodiment of the present invention, a DSP may perform the following functions: originate modem, answer modem, originate line test, and answer line test. Further, it should be clear to those of ordinary skill in the art as to how these functions may be emulated by a DSP. This may be performed as follows. First, a sending site would command its DSP subsystem to start emulating an originate modem on the channel being used for a particular connection. The recipient site commands its DSP subsystem to emulate an answer modem. For example, both DSP subsystems might emulate a Bell System 103 modem. Once the respective DSP subsystems report "carrier detect," the above-described data exchange takes place. Of course, those of ordinary skill in the art recognize that, just as with a standalone modem, it is possible to get a "carrier fault" at any time during the connection which would cause the connection to be dropped.

As has been described above, transitions occur from "modem" mode to "voice playback/recording" mode and then back to "modem" mode. This occurs as follows. First, receiving site "j" drops its carrier, i.e., stops sending the carrier tone. Second, sending site "i" detects a carrier fault, stops its own modem, and starts playing back a voice message. Third, receiving site "j" starts recording as soon as it detects that the carrier from sending site "i" has dropped. Fourth, as receiving site "j" is recording, it constantly monitors the incoming voice signal to detect the end thereof and the beginning of a modem carrier. Fifth, whenever sending site "i" reaches the end of the voice message, it turns on its answer modem, i.e., it puts carrier on the line. Lastly, receiving site "j" stops recording and starts its own originate modem.

Those skilled in the art recognize that further embodiments of the present invention may be made without departing from its teachings. For example, embodiments of the present invention may be fabricated utilizing a stand-alone, off-the-shelf modem along with hardware needed to switch it in and out of the line, the fabrication of which hardware is well known to those of ordinary skill in the art, so that voice can be sent over the same line. Further, embodiments of the present invention may be fabricated utilizing a stand-alone, off-the-shelf modem and wherein parallel calls are made from sending site to receiving site. In one such embodiment, one call will carry the voice signals and the other call will carry data transmission, i.e., commands and responses, using the modem. Still further, embodiments of the present invention may be fabricated utilizing DTMF tone generators and detectors for sending commands and responses as an alternative to the use of modems or modem emulators. Yet still further, embodiments of the present invention may be fabricated utilizing an alternative protocol such as, for example, wherein the message sender's spoken name and voice message are sent in one transmission, but separated by a predetermined tone.

APPENDIX

The following provides diagrams which set forth the precise format, in bits and bytes, of each command and response described above.

NOTES a. 'X' denotes information that is not relevant b. decimal numbers under diagrams indicate an offset, in bytes, from the beginning of a message to the start of the field c. all numbers inside the diagrams are hexadecimal d. a "node" is one of possibly multiple systems which are tightly connected in a Local Area Network (LAN) in one location and a "site" is either a single node or a multi-node (LAN) which is part of a loosely coupled network of systems in different geographical locations e. All two-byte values in the various fields use the following encoding scheme: low-byte first, followed by high-byte f. network addresses are encoded as follows: each digit occupies 4 bits; the first digit resides in the 4 least significant bits of the first byte, the second digit in the 4 most significant bits, the third digit in the 4 least significant bits of the second byte, and so forth. If the address consists of an odd number of digits, then the last byte looks like: 1111nnnn, where nnnn is the last digit. If the address consists of an even number of digits, then the last byte is hexadecimal FF. However, if the total number of digits in the address is 16 (which is the maximum currently allowed), then the last byte looks like mmmmnnnn, where nnnn is digit number 15, and mmmm is digit number 16 g. alphabetic names are encoded as follows: If no name is being sent (message sender's or recipient's), then hexadecimal FFFF is coded in. Otherwise, each of the letters of the name are converted to upper case, and then assigned a number between 0 and 25, with 'A' being 0, and 'Z' being 25. A space becomes 26. Each of the digits representing a letter occupies 5 bits. Three letters fit in 2 bytes. Each 2 bytes are then transmitted according to note 'e' above. The first letter uses the 5 least significant bits, the second letter the next 5 bits, the third letter the next 5 bits, and the remaining bit (the most significant bit in the 2 bytes) is set to zero. Then we continue with the second 2 bytes, and so forth. When all letters have been encoded, then the remaining bits in the last 2 bytes are set to 1.

Connect" command (43 bytes long):

| X | 24 | X | Ver Num | X | 24 | 2B | 3 | X | Chan Num | Piggy back | Exch Names |
|---|----|---|---------|---|----|----|----|---|----------|------------|------------|
| 0 | 7  | 8 | 10      | 11| 15 | 16 | 17 | 18| 21       | 22         | 23         |

| X | Site Num | X | Node Num |
|---|----------|---|----------|
| 24| 33       | 34| 42       | where:
  a. Ver Num: sending site's protocol version number.
  b. Chan Num: Sending site's channel number (port) being used for this call; currently a value between one (1) and sixteen (16)
  c. Piggyback: Zero (0) means no piggyback allowed; one (1) means piggyback allowed
  d. Exch Names: Zero (0) means calling site is not willing to exchange names with receiving site; one (1) means calling site is willing to send names, but not to receive them; two (2) means calling site is willing to send and receive names.
  e. Site Num: Sending site number. Currently a value between one (1) and fifty (50)
  f. Node Num: Sending node number; currently a value between one (1) and eight (8).

"Connect" response (43 bytes long):

| X | 24 | X | Ver Num | X | 24 | 2B | 4 | X | Chan Num | X | Exch Names |
|---|----|---|---------|---|----|----|---|---|----------|---|------------|
| 0 | 7  | 8 | 10      | 11| 15 | 16 | 17| 18| 21       | 22| 23         |

| X  | Status Code | X  | Site Num | X  | Node Num |
|----|-------------|----|----------|----|----------|
| 24 | 31          | 32 | 33       | 34 | 42       | where:
  a. Ver Num: Receiving site's protocol version number.
  b. Chan Num: Receiving site's channel number (port) being used for this call; currently a value between one (1) and sixteen (16)
  c. Exch Names: Zero (0) means receiving site is not willing to exchange names with calling site; one (1) means receiving site is willing to send names, but not to receive them; two (2) means receiving site is willing to send and receive names
  d. Status Code: Zero (0) means the receiving site accepts the call; any other value indicates the call is rejected. In the latter case, both sites disconnect the call without further ado
  e. Site Num: Receiving site number; currently a value between one (1) and fifty (50)
  f. Node Num: Receiving node number; currently a value between one (1) and eight (8).

"Record" command (variable length):

| 17 | 18 | Length | 0 | Spoken Names | Creation Time | Msg Size | Msg Code | Delivery Options |
|----|----|--------|---|--------------|---------------|----------|----------|------------------|
| 0  | 1  | 2      | 3 | 4            | 5             | 9        | 11       | 12               |

| Hop Count | Msg Id | VoiceId Count | VoiceId 1 | ... | VoiceId n | Recipient Address |
|-----------|--------|---------------|-----------|-----|-----------|-------------------|
| 13        | 14     | 17            | 18        |     | n         | 18 + 4 * n        |

| Sender Address | Recipient Name | Sender Name |
|----------------|----------------|-------------| a. Length: Total length of this message in bytes
  b. Spoken Names: Format is (in binary) ab0000cd, where 'a' is the most significant bit. 'a' is one (1) means that the sending site will transmit the spoken name for the message sender, even if the receiving site already has it; this is used to update changed spoken names. If 'a' is zero (0), then the sending site will only transmit the spoken name for the message sender if the receiving site requests it in the "Record response" message. 'b' is one (1) means that the sending site does not want to get from the receiving site either the alphabetic or the spoken names of the message recipient, even though: i) the sending site does not have them and ii) during session establishment the communicating sites had agreed that names would be transmitted from the receiving site to the sending site. This may happen, for example, if the sending site's database or voice storage becomes full in the middle of the session, such that no more entries may be added. If 'b' is zero (0) then the sending site is willing to accept the message recipient's alphabetic and/or spoken names, subject to the value of bit 'c', described below. 'c' is one (1) means the sending site already has the spoken name for the message recipient and therefore does not need it; otherwise, it does not have it. 'd' is one (1) means the sending site possesses the spoken name of the message sender and therefore is willing to transmit it if the receiving site requests so in the "Record response" message; otherwise, it does not have it
  c. Creation Time: The time the message was created. This is encoded in the following format: The first two (2) bytes contain the number of seconds (0–43199) since last midnight/noon. The last two (2) bytes contain the count of 12-hour periods since Mar. 1, 1952
  d. Msg Size: Size of voice message in seconds
  e. Msg Code: This indicates the type of voice message being delivered from sender to recipient. Currently used values are:
     0: Regular voice message
     1: Return receipt, message accepted
     2: Return receipt, message rejected
     3: Message is being returned, destination disk was full
     5: Message is being returned, destination mailbox was not accepting messages
     6: Message is being returned, destination mailbox was full
     7: Message is being returned, destination mailbox did not exist
     8 : Message is being returned, could not be delivered to destination mailbox due to some malfunction
     9: This is a "name only" message
     Clarification: Codes 3, 5, 6, 7, and 8, are applicable to the case where the receiving site originally accepted and received the message, but then discovered it could not distribute it to the intended recipient, so now it has to send the message back as a "returned message"
  f. Delivery Options: Format is 000edcba where 'a' is the least significant bit. Each one of the bits is one (1) if the corresponding option was requested by the sender of the message; otherwise it is zero (0)
     'a': Expedient network transmission (as opposed to normal, where messages are batched together and delivered at System Administrator defined times)
     'b': This is a forwarded message.
     'c': This is a private message (may not be forwarded by recipient)
     'd': A return receipt is being requested
     'e': Urgent delivery is being requested: message should be placed at the front of the queue of incoming messages in the recipient's mailbox g. Hop Count: Number of times that this message has been sent between sites h. Msg Id: A unique identification number for this message i. VoiceId Count Count of voice files comprising this message; this indicates how many VoiceId's follow j. VoiceID: Unique identification code for each recorded voice file. Each is 4 bytes long.

"Record" response (variable length):

| 17 | 19 | Length | 1 | Status Code | Sender Name Disposition | Spoken Names Resp | Recipient Name |
|---|---|---|---|---|---|---|---|
| 0 | 1 | 2 | 3 | 4 | 5 | 6 | 7 | a. Status Code: Currently possible values are:
   0: Message is accepted Will receive associated voice file
   2: Message is a duplicate, or already have voice file; either way, do not need to send voice file again
   3: Message not accepted because destination mailbox was not accepting messages
   4: Message not accepted because destination mailbox was full
   5: Message not accepted because disk was full
   6: Message not accepted because destination mailbox did not exist
   8: Message not accepted because destination mailbox was locked by the System Administrator
   9: Return receipt accepted. Understand that no voice file is forthcoming
   10: Message not accepted due to some malfunction
   13: Message not accepted because even though a local user existed with the desired address, his name did not match the requested one
   14: Message not accepted because even though a local user existed with the desired name, his address did not match the requested one.

b. Sender Name Disposition: Informs the sending site about disposition of received alphabetic name of message sender. Possible values are:
   0: Receiving site already had the name of the sender in its database, or sending site did not send a name in the "Record" command
   1: Receiving site has added the received name to its database
   2: Receiving site could not add received name because the database was full
   3: Receiving site could not add received name because of some malfunction.

c. Spoken Names Resp: This is the response to the "Spoken Names" field in the "Record" command. Format is (in binary) 000000cd, where 'd' is one (1) if the receiving site will accept the spoken name for the message sender, otherwise it is zero (0). 'c' is one (1) if receiving site will send the spoken name of the message recipient, otherwise it is zero (0).

"Stop" response (5 bytes long):

| 17 | 19 | 5 | 2 | Status Code |
|---|---|---|---|---|
| 0 | 1 | 2 | 3 | 4 |

Status Code: May be zero (0) meaning voice file was received without errors and message has been delivered to recipient; or three (3), four (4), six (6), eight (8), or ten (10), with same meanings as defined for "Record" response.

"Piggyback" command (4 bytes long):

| 4 | 17 | 4 | 3 |
|---|---|---|---|
| 0 | 1 | 2 | 3 |

What is claimed is:

1. A method for transmitting data messages and voice signals between a sending store-and-forward messaging system site and a receiving store-and-forward messaging site of a network of store-and-forward messaging systems which are connected by one or more telephone lines, a portion of the voice signals being sent from a message sender who interacts with the sending site to a message recipient who interacts with the receiving site, the method comprising the steps of:

placing a telephone call from the sending site to the receiving site to a predetermined telephone number over one of the telephone lines;

connecting data transmission and reception apparatus to the telephone line at the sending site and the receiving site;

exchanging predetermined control commands and data messages using the data transmission and reception apparatus at the sending and receiving sites, the predetermined control commands specifying a procedure for communications between the sites;

disabling the data transmission and reception apparatus from exchanging control commands and data messages and connecting voice transmission and reception apparatus to the telephone line at the sending site and the receiving site;

transmitting voice signals between the sending and receiving sites using the voice transmission and reception apparatus at the sending and receiving sites;

enabling the data transmission and reception apparatus for exchanging control commands and data messages at the sending site and the receiving site;

exchanging delivery information using the data transmission and reception apparatus at the sending and receiving sites, which delivery information indicates the success or failure of the voice signal transmission and further communication procedure; and one of the sites going on hook.

2. The method of claim 1 wherein the step of exchanging predetermined control commands and data messages comprises the steps of:

the sending site transmitting a connect command to the receiving site, which connect command specifies: (a) a protocol communication version identifier, (b) a channel identifier, (c) an indication of whether the sending site will permit the receiving site to transmit messages back to the sending site, (d) an indication of whether the sending site will exchange names with the receiving site, and (e) an identification of the sending site and, in response;

the receiving site transmitting a connect response to the sending site, which connect response specifies: (a) a protocol communication version identifier, (b) a channel identifier, (c) an indication of whether the receiving site will exchange names with the sending site, (d) an indication of whether the receiving site will accept the call, and (e) an identification of the receiving site.

3. The method of claim 2 wherein the step of exchanging predetermined control commands and data messages further comprises:

the sending site transmitting a record command to the receiving site after the sending site receives the connect response from the receiving site, the record command specifying: (a) a network address for the message sender and the message recipient, (b) the message recipient's alphabetic name if available at the sending site, (c) message sender's alphabetic name if sender and recipient names are exchanged, and (d) an indication of whether spoken names for the message sender and the message recipient are available at the sending site and, in response;

the receiving site transmitting a record response to the sending site, the record response specifying: (a) an indication of whether the receiving site will accept the voice signals, (b) an indication of whether the message sender's name was added to a database at the receiving site, and (c) an indication of whether the receiving site wishes to receive the spoken name of the message recipient.

4. The method of claim 3 wherein the step of exchanging delivery information further comprises the steps of:

the receiving site transmitting a stop response to the sending site, which stop response indicates the status of the transmission of voice signals.

5. The method of claim 3 wherein the step of exchanging delivery information further comprises the steps of:

the sending site transmitting a stop response to the receiving site, which stop response indicates the status of the transmission of voice signals.

6. The method of claim 4 wherein the step of exchanging predetermined delivery information further comprises the steps of:

the receiving site transmitting a piggyback command to the sending site, which piggyback command specifies that the receiving site has the option of becoming the sending site and the sending site becoming the receiving site for the purpose of transmitting voice signals from the receiving site to the sending site.

* * * * *